US011961997B2

United States Patent
Matsuno et al.

(10) Patent No.: US 11,961,997 B2
(45) Date of Patent: Apr. 16, 2024

(54) NEGATIVE ELECTRODE ACTIVE MATERIAL, MIXED NEGATIVE ELECTRODE ACTIVE MATERIAL, AQUEOUS NEGATIVE ELECTRODE SLURRY COMPOSITION, AND METHOD FOR PRODUCING NEGATIVE ELECTRODE ACTIVE MATERIAL

(71) Applicant: SHIN-ETSU CHEMICAL CO., LTD., Tokyo (JP)

(72) Inventors: Takumi Matsuno, Annaka (JP); Hidekazu Awano, Takasaki (JP); Takakazu Hirose, Annaka (JP); Kohta Takahashi, Takasaki (JP); Yusuke Osawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/290,935

(22) PCT Filed: Sep. 25, 2019

(86) PCT No.: PCT/JP2019/037442
§ 371 (c)(1),
(2) Date: May 3, 2021

(87) PCT Pub. No.: WO2020/095558
PCT Pub. Date: May 14, 2020

(65) Prior Publication Data
US 2021/0376311 A1    Dec. 2, 2021

(30) Foreign Application Priority Data

Nov. 7, 2018   (JP) .................................. 2018-209505

(51) Int. Cl.
*H01M 4/131*   (2010.01)
*H01M 4/02*   (2006.01)
(Continued)

(52) U.S. Cl.
CPC ........... *H01M 4/364* (2013.01); *H01M 4/131* (2013.01); *H01M 4/133* (2013.01); *H01M 4/139* (2013.01);
(Continued)

(58) Field of Classification Search
CPC ...... H01M 4/131; H01M 4/133; H01M 4/139; H01M 4/1391; H01M 4/1393;
(Continued)

(56) References Cited

U.S. PATENT DOCUMENTS 5,395,711 A  *  3/1995   Tahara .................. H01M 10/05
                                                                        429/231.95
7,459,236 B2   12/2008   Konishiike et al.
(Continued)

FOREIGN PATENT DOCUMENTS

CN    108701825 A      10/2018
JP     63274608 A  * 11/1988  ............. C01B 25/36
(Continued)

OTHER PUBLICATIONS

Wright et al. ("The structure of the beta-cristobalite phases of SiO2 and AlPO4", The Philosophical Magazine: A Journal of Theoretical Experimental and Applied Physics, Series 8, vol. 31, 1975, Abstract only). (Year: 1975).*
(Continued)

Primary Examiner — Matthew R Diaz
(74) Attorney, Agent, or Firm — Oliff PLC (57) ABSTRACT

A negative electrode active material for a non-aqueous electrolyte secondary battery, containing negative electrode active material particles, including silicon compound par-
(Continued)

ticles each containing a silicon compound ($SiO_x$: $0.5 \leq x \leq 1.6$) and at least one or more of $Li_2SiO_3$ and $Li_2Si_2O_5$, the material includes a phosphate, the negative electrode active material particles each have a surface containing lithium element, and a ratio $m_p/m_l$ satisfies $0.02 \leq m_p/m_l \leq 3$, where $m_l$ represents a molar quantity of the lithium element and contained per unit mass of the particles, and $m_p$ represents a molar quantity of phosphorus element contained per unit mass of the particles. Thereby, a negative electrode active material is capable of stabilizing an aqueous negative electrode slurry prepared in producing a negative electrode of a secondary battery, and capable of improving initial charge-discharge characteristics when the negative electrode active material is used for a secondary battery.

11 Claims, 2 Drawing Sheets

(51) Int. Cl.
| | |
|---|---|
| *H01M 4/133* | (2010.01) |
| *H01M 4/139* | (2010.01) |
| *H01M 4/36* | (2006.01) |
| *H01M 4/485* | (2010.01) |
| *H01M 4/58* | (2010.01) |
| *H01M 4/587* | (2010.01) |

(52) U.S. Cl.
CPC ........... *H01M 4/366* (2013.01); *H01M 4/485* (2013.01); *H01M 4/5825* (2013.01); *H01M 4/587* (2013.01); *H01M 2004/021* (2013.01); *H01M 2004/027* (2013.01)

(58) Field of Classification Search
CPC ...... H01M 4/362; H01M 4/364; H01M 4/366; H01M 4/386; H01M 4/483; H01M 4/485; H01M 4/5825; H01M 4/587; H01M 4/625; H01M 2004/021; H01M 2004/027; H01M 10/052; H01M 10/0525
See application file for complete search history.

(56) References Cited

U.S. PATENT DOCUMENTS

| | | | |
|---|---|---|---|
| 8,377,592 B2 | 2/2013 | Jeong et al. | |
| 2006/0099507 A1 | 5/2006 | Kogetsu et al. | |
| 2008/0176137 A1 | 7/2008 | Endo et al. | |
| 2009/0202911 A1 | 8/2009 | Fukuoka et al. | |
| 2017/0125806 A1* | 5/2017 | Wang | ........................ H01M 4/48 |
| 2017/0214041 A1* | 7/2017 | Minami | ................. H01M 4/485 |
| 2019/0097217 A1* | 3/2019 | Hirose | .................. H01M 4/131 |
| 2019/0214637 A1* | 7/2019 | Hirose | ................ H01M 4/5825 |
| 2019/0229332 A1 | 7/2019 | Hirose et al. | |

FOREIGN PATENT DOCUMENTS

| | | | | | |
|---|---|---|---|---|---|
| JP | 2997741 | B2 | 1/2000 | | |
| JP | 2001-185127 | A | 7/2001 | | |
| JP | 2002-042806 | A | 2/2002 | | |
| JP | 2006-114454 | A | 4/2006 | | |
| JP | 2006-164954 | A | 6/2006 | | |
| JP | 2007-234255 | A | 9/2007 | | |
| JP | 2008-177346 | A | 7/2008 | | |
| JP | 2008-251369 | A | 10/2008 | | |
| JP | 2008-282819 | A | 11/2008 | | |
| JP | 2009-070825 | A | 4/2009 | | |
| JP | 2009-205950 | A | 9/2009 | | |
| JP | 2009-212074 | A | 9/2009 | | |
| JP | 2010-092830 | A | 4/2010 | | |
| JP | 2014082118 | A | * | 5/2014 | |
| JP | 2017-152358 | A | | 8/2017 | |
| JP | 2017152358 | A | * | 8/2017 | ............. C01B 25/28 |
| JP | 2018-60771 | A | | 4/2018 | |
| TW | 201810780 | A | | 3/2018 | |
| WO | 2017/217077 | A1 | | 12/2017 | |
| WO | WO-2017217077 | A1 | * | 12/2017 | ............. C01B 25/36 |
| WO | 2018/061536 | A1 | | 4/2018 | |

OTHER PUBLICATIONS

Hatch et al. ("The alpha-beta phase transition in AlPO4 cristobalite: symmetry analysis, domain structure and transition dynamics", Phys. Chem. Minerals, 21, 1994, 67-77) (Year: 1994).*
Jan. 25, 2022 Office Action issued in Japanese Patent Application No. 2018-209505.
Aug. 31, 2021 Office Action issued in Japanese Patent Application No. 2018-209505.
Jun. 28, 2022 Extended European Search Report in European Application No. 19882148.0.
Nov. 12, 2019 International Search Report issued in International Patent Application No. PCT/JP2019/037442.
May 11, 2021 International Preliminary Report on Patentability issued in International Patent Application No. PCT/JP2019/037442.
Feb. 15, 2023 Search Report issued in Taiwanese Application No. 108135428.
Nov. 24, 2023 Office Action issued in Chinese Patent Application No. 201980072561.3.

* cited by examiner

$^{29}$Si CHEMICAL SHIFT (ppm)

[FIG. 4]

NEGATIVE ELECTRODE ACTIVE MATERIAL, MIXED NEGATIVE ELECTRODE ACTIVE MATERIAL, AQUEOUS NEGATIVE ELECTRODE SLURRY COMPOSITION, AND METHOD FOR PRODUCING NEGATIVE ELECTRODE ACTIVE MATERIAL

TECHNICAL FIELD

The present invention relates to a negative electrode active material, a mixed negative electrode active material, an aqueous negative electrode slurry composition, and a method for producing a negative electrode active material.

BACKGROUND ART

In recent years, small electronic devices, represented by mobile terminals, have been widely used and urgently required to reduce the size and weight and to increase the life. Such market requirements have advanced the development of particularly small and lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity, and have higher energy density than that of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon-based active material, is required to further improve the battery capacity for recent market requirement. Use of silicon as a negative electrode active material is considered to improve the battery capacity, for silicon has a theoretical capacity (4199 mAh/g) ten times or more larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes ranges from an application type, which is standard for carbon materials, to an integrated type in which the materials are directly accumulated on a current collector.

Use of silicon as a main material of a negative electrode active material, however, expands or shrinks the negative electrode active material when charging or discharging, thereby making the negative electrode active material easy to break particularly near its surface layer. In addition, this negative electrode active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle characteristics easy to reduce.

Various materials of a negative electrode active material for a lithium-ion secondary battery mainly using a silicon material and various electrode configurations have been considered to improve the initial efficiency and the cycle characteristics of the battery.

Specifically, a vapor deposition method is used to accumulate silicon and amorphous silicon dioxide simultaneously so that better cycle characteristics and greater safety are achieved (see Patent Document 1, for example). Moreover, a carbon material (electronic conduction material) is disposed on the surface of silicon oxide particles so that a higher battery capacity and greater safety are achieved (see Patent Document 2, for example). Moreover, an active material including silicon and oxygen is produced to form an active material layer having a higher ratio of oxygen near a current collector so that improved cycle characteristics and higher input-output characteristics are achieved (see Patent Document 3, for example). Moreover, silicon active material is formed so as to contain oxygen with an average oxygen content of 40 at % or less and with a higher oxygen content near a current collector so that improved cycle characteristics are achieved (see Patent Document 4, for example).

Moreover, a nano-complex including Si-phase, $SiO_2$, and $M_yO$ metal oxide is used to improve the first time charge-discharge efficiency (see Patent Document 5, for example). To improve the cycle characteristics, $SiO_x$ ($0.8 \leq x \leq 1.5$, the range of particle size=1 µm to 50 µm) and a carbon material are mixed and calcined at a high temperature (see Patent Document 6, for example). A negative electrode active material is controlled by adjusting a mole ratio of oxygen to silicon in the active material in the range from 0.1 to 1.2 so as to hold a difference between the maximum and the minimum of the oxygen-to-silicon mole ratio near the interface between the active material and a current collector at 0.4 or less, so that improved cycle characteristics are achieved (see Patent Document 7, for example). Moreover, a metal oxide containing lithium is used to improve the battery load characteristics (see Patent Document 8, for example). To improve the cycle characteristics, a hydrophobic layer such as a silane compound layer is formed on the surface of a silicon material (see Patent Document 9, for example).

Moreover, a silicon oxide is used and a surface thereof is coated with graphite coating to give electric conductivity so that improved cycle characteristics are achieved (see Patent Document 10, for example). In Patent Document 10, the graphite coating exhibits a RAMAN spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, particles having a silicon microcrystal phase dispersed in a silicon dioxide are used to achieve a higher battery capacity and improved cycle characteristics (see Patent Document 11, for example). Moreover, a silicon oxide controlled to have a silicon-to-oxygen atomicity ratio of 1:y ($0 < y < 2$) is used to improve overcharge and overdischarge characteristics (see Patent Document 12, for example).

When a silicon material is used, the use of a silicon material doped with Li can bring higher initial efficiency and capacity retention rate. Meanwhile, the Li-doped silicon material is less stable in aqueous solvents, and lowers the stability of an aqueous negative electrode slurry, which is mixed with the silicon material when prepared in negative electrode production. Hence, Li-doped silicon materials are unsuitable for industrial use. To improve the stability of the aqueous negative electrode slurry, a phosphate salt is adhered to the outermost surface layer of a Li-doped silicon material, so that the water resistance is increased (see Patent Document 13, for example). Nevertheless, the stability of such aqueous negative electrode slurry is insufficient; for example, when the aqueous negative electrode slurry is stored at high temperature, gas generation can be observed.

CITATION LIST

Patent Literature

Patent Document 1: JP 2001-185127 A
Patent Document 2: JP 2002-042806 A
Patent Document 3: JP 2006-164954 A
Patent Document 4: JP 2006-114454 A
Patent Document 5: JP 2009-070825 A
Patent Document 6: JP 2008-282819 A
Patent Document 7: JP 2008-251369 A
Patent Document 8: JP 2008-177346 A
Patent Document 9: JP 2007-234255 A
Patent Document 10: JP 2009-212074 A
Patent Document 11: JP 2009-205950 A
Patent Document 12: JP 2997741 B
Patent Document 13: JP 2017-152358 A

SUMMARY OF INVENTION

Technical Problem

As described above, small electronic devices, represented by mobile devices, have been advancing recently toward high performance and multifunction, and a lithium-ion secondary battery that is main electric source thereof is required to increase the battery capacity. As a technique to solve this problem, it is desired to develop a lithium-ion secondary battery containing a negative electrode using a silicon material as a main material.

Meanwhile, when a silicon material is used, the use of Li-doped silicon material can achieve higher initial efficiency and capacity retention rate. However, such Li-doped silicon material is unsuitable for industrial use due to low stability in aqueous solvents, and consequently due to low stability of an aqueous negative electrode slurry prepared as a mixture with the silicon material in negative electrode production. For the stabilization of the aqueous negative electrode slurry, the Li-doped silicon material is subjected to surface treatment, but the stability of such aqueous negative electrode slurries is still insufficient.

The present invention has been made in view of the above problems. An object of the present invention is to provide: a negative electrode active material that is capable of stabilizing an aqueous negative electrode slurry prepared in producing a negative electrode of a secondary battery, and capable of improving initial charge-discharge characteristics when the negative electrode active material is used for a secondary battery; and a mixed negative electrode active material containing the negative electrode active material. Another object is to provide an aqueous negative electrode slurry composition that is stable when a negative electrode is prepared. Still another object is to provide a method for producing a negative electrode active material that is capable of stabilizing a slurry prepared in producing a negative electrode, and capable of improving initial charge-discharge characteristics.

Solution to Problem

To achieve the object, the present invention provides a negative electrode active material for a non-aqueous electrolyte secondary battery, containing negative electrode active material particles, wherein the negative electrode active material particles comprise silicon compound particles each containing a silicon compound ($SiO_x$: $0.5 \leq x \leq 1.6$),
the silicon compound particle contains at least one or more of $Li_2SiO_3$ and $Li_2Si_2O_5$,
the negative electrode active material comprises a phosphate,
the negative electrode active material particles each have a surface containing lithium element, and
a ratio $m_p/m_l$ satisfies $0.02 \leq m_p/m_l \leq 3$, where $m_l$ represents a molar quantity of the lithium element present on the surfaces of the negative electrode active material particles and contained per unit mass of the negative electrode active material particles, and $m_p$ represents a molar quantity of phosphorus element contained per unit mass of the negative electrode active material particles.

Since the inventive negative electrode active material (also referred to as silicon-based active material) contains negative electrode active material particles including silicon compound particles (also referred to as silicon-based active material particles), the battery capacity can be improved. Moreover, incorporating the Li compound(s) in the silicon compound particles makes it possible to reduce irreversible capacity generated in charging. Thereby, the first time efficiency can be improved. Further, since a phosphate is incorporated, when the negative electrode active material is mixed with an aqueous negative electrode slurry composition (also referred to as aqueous negative electrode slurry) in the process of producing a negative electrode, Li ions eluted from the silicon compound particles are neutralized, so that the pH of the aqueous negative electrode slurry is appropriately kept, making it possible to increase the slurry stability. Furthermore, forming lithium phosphate salt on the surfaces of the silicon-based active material particles in the aqueous negative electrode slurry increases the lithium ion concentration near the surfaces, and can suppress elution of Li ions from the interior of the active material particles. In this regard, since the ratio $m_p/m_l$ between the molar quantity (hereinafter may also be referred to as amount of substance) $m_l$ of the lithium element contained on the surfaces of the negative electrode active material particles and the molar quantity $m_p$ of the phosphorus element contained in the negative electrode active material particles is controlled within the aforementioned range, it is possible to suppress Li compound elution into the aqueous negative electrode slurry during high-temperature storage and also to suppress gas generation.

In this case, the ratio $m_p/m_l$ preferably satisfies $0.07 \leq m_p/m_l \leq 0.8$.

With the ratio $m_p/m_l$ controlled within this range, it is possible to obtain a more stable aqueous negative electrode slurry even during high-temperature storage during which Li compound elution is more likely to occur.

Additionally, the phosphate is preferably aluminum phosphate tribasic.

Since the phosphate contains aluminum as a constituent element, the reaction with an anionic functional group of a binder component in an aqueous negative electrode slurry enables further enhancement of the slurry stability.

Moreover, the aluminum phosphate tribasic preferably has a cristobalite-type crystal structure.

Such phosphate as described above has suitable solubility in an aqueous negative electrode slurry. Accordingly, more stable aqueous negative electrode slurry can be obtained.

Further, the negative electrode active material particles preferably cause a dispersion containing 10 mass % of the negative electrode active material particles dispersed in pure water to have a pH value of 10 or more and 12.5 or less.

When an aqueous negative electrode slurry is prepared by using negative electrode active material particles whose dispersion liquid has a pH in the above range, the pH change of the aqueous negative electrode slurry during storage can be reduced. Accordingly, more stable aqueous negative electrode slurry can be obtained.

In addition, preferably, the silicon compound particles have a diffraction peak attributable to a Si(220) crystal face obtained from an X-ray diffraction using a Cu-Kα line, and a crystallite size calculated from a half value width (2θ) of the diffraction peak is 7.5 nm or less.

When the negative electrode active material with the silicon compound particles having the above silicon crystallinity is used in an aqueous negative electrode slurry for a lithium-ion secondary battery, hydrogen generation by reaction between silicon and water in the aqueous negative electrode slurry can be suppressed. Accordingly, more stable aqueous negative electrode slurry is obtained.

Additionally, the silicon compound particles preferably satisfy a relation of A>B, where A represents a maximum peak intensity value in Si and Li silicate regions given as a chemical shift value of −60 to −95 ppm, and B represents a peak intensity value in a $SiO_2$ region given as a chemical shift value of −96 to −150 ppm, the values being obtained from a $^{29}$Si-MAS-NMR spectrum of the silicon compound particles.

When the silicon compound particles contain larger amounts of Si and Li silicate relative to the $SiO_2$ component, the effect of improving the battery characteristics through the Li insertion is sufficiently obtained from the negative electrode active material.

Further, the negative electrode active material particles preferably have a median diameter of 1.0 μm or more and 15 μm or less and a BET specific surface area of 1 $m^2$/g or more and 5 $m^2$/g or less.

When the negative electrode active material particles have a median diameter (volume-based) of 1.0 μm or more, it is possible to suppress increase of the irreversible battery capacity due to increase of the specific surface area. Meanwhile, when the median diameter is 15 μm or less, the particles become less liable to break, thereby forming fewer new surfaces. Further, when the specific surface area is 1 $m^2$/g or more, the effect of stabilizing the aqueous negative electrode slurry by the phosphate can be more effectively obtained. Meanwhile, when the specific surface area is 5 $m^2$/g or less, the lithium compound elution in the aqueous negative electrode slurry can be suppressed more effectively.

Further, the negative electrode active material particle preferably has a surface layer portion containing a carbon material.

When the surface layer portion of each negative electrode active material particle contains a carbon material as described above, the electric conductivity is improved. Moreover, contact between the silicon compound particles and water in the aqueous negative electrode slurry can be suppressed, so that the lithium compound elution can be suppressed.

Additionally, the carbon material preferably has an average thickness of 10 nm or more and 1000 nm or less.

When the average thickness of the carbon material is 10 nm or more, sufficient electric conductivity improvement is achieved. Meanwhile, when the average coating thickness of the carbon material is 1000 nm or less, the use of the negative electrode active material containing such negative electrode active material particles for a lithium-ion secondary battery makes it possible to secure a sufficient amount of the silicon compound particles therein, thereby preventing lowering of the battery capacity.

To achieve the above-described object, the present invention also provides a mixed negative electrode active material comprising:

the above-described negative electrode active material; and a carbon-based active material.

When a negative electrode contains a carbon-based active material in addition to the inventive negative electrode active material (silicon-based active material) as the material for forming a negative electrode active material layer, it is possible to not only improve the electric conductivity of the negative electrode active material layer but also ease the expanding stress due to charging. Moreover, the battery capacity can be increased by mixing the silicon-based active material with a carbon-based active material.

Further, the present invention provides an aqueous negative electrode slurry composition for a non-aqueous electrolyte secondary battery, comprising the above-described negative electrode active material.

Such an aqueous negative electrode slurry composition becomes a stable aqueous negative electrode slurry, and can suppress over-time changes due to gas generation during storage, for example. Accordingly, the production process can be designed quite freely, and this slurry composition is suitable for industrial use. In addition, the use of the aqueous negative electrode slurry composition to prepare a negative electrode enables a secondary battery having high capacity and favorable initial charge-discharge characteristics.

Furthermore, the present invention provides a method for producing a negative electrode active material containing negative electrode active material particles including silicon compound particles, the method comprising steps of:

preparing silicon compound particles each containing a silicon compound ($SiO_x$: 0.5≤x≤1.6);

inserting Li into the silicon compound particles to incorporate at least one or more of $Li_2SiO_3$ and $Li_2Si_2O_5$; and blending the negative electrode active material particles with a phosphate to produce a negative electrode active material satisfying a ratio $m_p/m_l$ of 0.02≤$m_p/m_l$≤3, where $m_l$ represents a molar quantity of lithium element present on surfaces of the negative electrode active material particles and contained per unit mass of the negative electrode active material particles, and $m_p$ represents a molar quantity of phosphorus element contained per unit mass of the negative electrode active material particles.

When negative electrode active material particles including Li-inserted silicon compound particles is mixed with a phosphate to produce a negative electrode active material such that the ratio $m_p/m_l$ is within the aforementioned range as described above, it is possible to produce a negative electrode active material which is capable of stabilizing an aqueous negative electrode slurry prepared in producing a negative electrode, and which has high capacity and also favorable cycle characteristics and initial charge-discharge characteristics when the negative electrode active material is used for a secondary battery.

Advantageous Effects of Invention

The inventive negative electrode active material is capable of suppressing over-time changes such as gas generation from an aqueous negative electrode slurry prepared in producing a negative electrode, and brings high capacity and favorable initial charge-discharge characteristics when used as a negative electrode active material for a secondary battery. Moreover, the mixed negative electrode active material containing this negative electrode active material also brings the same effects. Further, the inventive aqueous negative electrode slurry composition brings high capacity and favorable initial charge-discharge characteristics when used to produce a negative electrode for a secondary battery. Furthermore, the inventive method for producing a negative electrode active material makes it possible to produce a negative electrode active material capable of stabilizing an aqueous negative electrode slurry prepared in producing a negative electrode, and capable of exhibiting favorable initial charge-discharge characteristics when the negative electrode active material is used for a lithium-ion secondary battery.

DESCRIPTION OF EMBODIMENTS

Hereinafter, embodiments of the present invention will be described, but the present invention is not limited thereto.

As described above, as a technique to increase the battery capacity of lithium-ion secondary battery, there has been investigated the use of a negative electrode mainly made from a silicon material as a negative electrode for lithium-ion secondary battery. Such a lithium-ion secondary battery using the silicon material is desired to have slurry stability, initial charge-discharge characteristics, and cycle characteristics almost equivalent to those of a lithium-ion secondary battery using a carbon-based active material. However, there has not been proposed a negative electrode active material having slurry stability and initial charge-discharge characteristics equivalent to those of a lithium-ion secondary battery using a carbon-based active material.

Accordingly, the present inventors have diligently investigated to obtain a negative electrode active material that enables high battery capacity and also favorable slurry stability and first time efficiency when used in a secondary battery; thereby, providing the present invention.

[Inventive Negative Electrode Active Material]

A negative electrode active material according to the present invention contains negative electrode active material particles. Moreover, the negative electrode active material particles include silicon compound particles each containing a silicon compound ($SiO_x$: $0.5 \leq x \leq 1.6$). This silicon compound particle contains at least one or more lithium silicates of $Li_2SiO_3$ and $Li_2Si_2O_5$. Since the inventive negative electrode active material contains negative electrode active material particles including silicon compound particles as described above, the battery capacity can be improved. Further, the silicon compound particles contain lithium silicate(s) as described above, irreversible capacity generated in charging can be reduced. Consequently, these make it possible to improve the battery capacity, cycle characteristics, and first time charge-discharge efficiency of a secondary battery.

Furthermore, the inventive negative electrode active material contains a phosphate. Moreover, the negative electrode active material particles each have a surface containing lithium element, and satisfy a ratio $m_p/m_l$ of $0.02 \leq m_p/m_l \leq 3$, where $m_l$ represents a molar quantity of the lithium element present on the surfaces of the negative electrode active material particles and contained per unit mass of the negative electrode active material particles, and $m_p$ represents a molar quantity of phosphorus element contained per unit mass of the negative electrode active material particles. Here, the lithium element may be present in the form of ion or lithium compound. Incorporating a phosphate in the negative electrode active material at such a ratio successfully stabilizes an aqueous negative electrode slurry prepared by mixing the negative electrode active material when a negative electrode is produced. Heretofore, when a negative electrode active material containing Li-inserted silicon compound particles is mixed in an aqueous negative electrode slurry in negative electrode production, Li ion and Li compound are eluted and the slurry becomes unstable. This makes it difficult to prepare an electrode, or extra Li compounds are formed on the electrode surface prepared from such a slurry, for example. Consequently, the battery characteristics are degraded. Particularly, the instability of slurry is noticeable at high temperatures. In contrast, as in the present invention, in the negative electrode active material containing a phosphate at an appropriate ratio relative to the lithium element amount on the surfaces of the negative electrode active material particles, the phosphate neutralizes Li ions eluted from the silicon compound particles and appropriately keeps the pH of the aqueous negative electrode slurry, so that the aqueous negative electrode slurry can be kept in a stable state even during high-temperature storage.

Moreover, as lithium phosphate salt(s) are formed on the surfaces of the silicon-based active material particles in the aqueous negative electrode slurry, the lithium ion concentration near the surfaces is increased, and the elution of Li ions from the interior of the active material particles can be suppressed. In this regard, since the ratio $m_p/m_l$ between the molar quantity $m_l$ of the surface lithium element contained on the negative electrode active material particles and the molar quantity $m_p$ of the phosphorus element contained in the negative electrode active material particles is controlled within the above-described range, this makes it possible to suppress both gas generation and Li compound elution into the aqueous negative electrode slurry during high-temperature storage.

Moreover, in the negative electrode active material, the ratio $m_p/m_l$ preferably satisfies $0.07 \leq m_p/m_l \leq 0.8$. Controlling the ratio $m_p/m_l$ within this range enables the aqueous negative electrode slurry to be more stable even during high-temperature storage during which Li compound elution is more likely to happen.

The ratio $m_p/m_l$ may be calculated such that $m_l$ represents a molar quantity of the lithium element present on the surfaces of the negative electrode active material particles and contained per g of the negative electrode active material particles, and that $m_p$ represents a molar quantity of the phosphorus element contained per g of the negative electrode active material particles.

The molar quantity ($m_l$) of the lithium element present on the surfaces of the negative electrode active material particles can be quantified with ICP-OES (inductively coupled plasma-optical emission spectrometer) after filtration of an aqueous dispersion prepared by dispersing the negative electrode active material particles in water, for example.

Alternatively, the molar quantity ($m_l$) of the lithium element present on the surfaces of the negative electrode active material particles may be calculated, for example, from a Li content obtained according to the following calculation formula after filtration of an aqueous dispersion prepared by dispersing the negative electrode active material particles in water, followed by titration with 0.1 N hydrochloric acid to obtain a titration amount "a" (ml) at the end point (pH: 5.0).

(Li content on surfaces of negative electrode active material particles)=($a$/1000)×(normality of hydrochloric acid titration liquid×factor)×(molecular weight of Li)×(100(%)/sample amount (g))

The molar quantity ($m_p$) of the phosphorus element contained in the negative electrode active material particles can be determined, for example, by performing quantification with ICP-OES on a solution in which the negative electrode active material particles are dissolved. In this event, as the solution for dissolving the negative electrode active material particles, for example, a mixed solution of hydrofluoric acid and nitric acid can be used.

Additionally, the phosphate contained in the inventive negative electrode active material particles is preferably aluminum phosphate tribasic. The phosphate containing aluminum as a constituent element can further enhance slurry stability by reacting with an anionic functional group of a binder component in the aqueous negative electrode slurry. Moreover, since aluminum phosphate tribasic has higher aluminum content than aluminum phosphate monobasic and aluminum polyphosphate, the slurry stability can be further enhanced.

The ratio of the amount of substance of phosphorus element relative to aluminum element in the aluminum phosphate tribasic is preferably 1.0 or more and 1.2 or less. With this range, the amount of diphosphorus pentaoxide contained as impurity is so small that suitable neutralization effect can be obtained when the inventive negative electrode active material is added to the aqueous negative electrode slurry.

Further, the phosphate contained in the inventive negative electrode active material particles is preferably aluminum phosphate tribasic having a cristobalite-type crystal structure. This phosphate has suitable solubility in an aqueous negative electrode slurry, so that more stable aqueous negative electrode slurry can be obtained.

Figure 2:
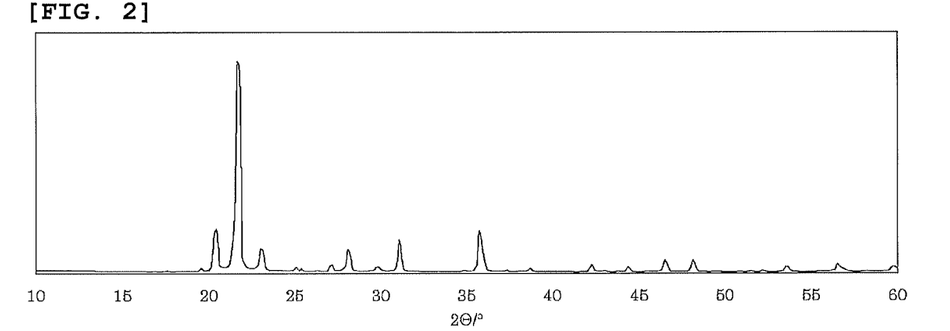
FIG. 2 is an example of an X-ray diffraction spectrum measured for aluminum phosphate tribasic having a cristobalite-type crystal structure.

The crystal structure of the aluminum phosphate tribasic can be confirmed by measurement of X-ray diffraction spectrum with a Cu-Kα line. FIG. 2 shows an X-ray diffraction spectrum of the aluminum phosphate tribasic having a cristobalite-type crystal structure. There is a main peak around 21.6°±0.5°, and there are also peaks around 20.6°, 31.1°, and 35.7°.

In addition, preferably, a dispersion obtained by dispersing the negative electrode active material particles in a proportion of 10 mass % into pure water has a pH value of 10 or more and 12.5 or less. When an aqueous negative electrode slurry is prepared using the negative electrode active material particles whose 10 mass % dispersion has a pH of 10 or more, the aqueous negative electrode slurry does not have small pH value. Hence, the elution rate of lithium ions is so low that the over-time changes of the aqueous negative electrode slurry can be reduced. Meanwhile, when an aqueous negative electrode slurry is prepared using the negative electrode active material particles whose 10 mass % dispersion has a pH of 12.5 or less, the Li ion concentration can be reduced. Hence, the reaction with an anionic functional group of a binder component does not take place strongly, so that the aqueous negative electrode slurry can be further stabilized. Particularly, in the case where the 10 mass % dispersion has a pH of 12.5 or less, when the negative electrode active material particles is added to an aqueous negative electrode slurry using carboxymethyl cellulose as a binder, the pH of the aqueous negative electrode slurry can be reduced. This suppresses depolymerization of the carboxymethyl cellulose, so that the aqueous negative electrode slurry hardly has low viscosity. As described above, when an aqueous negative electrode slurry is prepared using the negative electrode active material particles whose dispersion has a pH within the above-described range, it is possible to reduce the pH change of the aqueous negative electrode slurry during storage, and thus obtain more stable aqueous negative electrode slurry.

In addition, preferably, the silicon compound particles constituting the negative electrode active material particles have a diffraction peak attributable to a Si(220) crystal face obtained from an X-ray diffraction using a Cu-Kα line, and a crystallite size which corresponds to the crystal face, and which is calculated from a half value width (2θ) of the diffraction peak, is 7.5 nm or less. This peak appears around 2θ=47.2±0.5° when the crystallinity is high (when the half value width is narrow). In the silicon compound particles, the lower the silicon crystallinity of the silicon compound, the better. Particularly, when the content of the Si crystal is lower, the battery characteristics can be improved, and stable Li compound can be formed, too. Moreover, it is possible to suppress hydrogen generation by reaction between silicon and water, and thus obtain more stable aqueous negative electrode slurry.

Further, in the present invention, the silicon compound particles preferably satisfy a relation of A>B, where A represents a maximum peak intensity value in Si and Li silicate regions given as a chemical shift value of −60 to −95 ppm, and B represents a peak intensity value in a $SiO_2$ region given as a chemical shift value of −96 to −150 ppm, the values being obtained from a $^{29}$Si-MAS-NMR spectrum of the silicon compound particles. The effect of improving the battery characteristics through the Li insertion is sufficiently obtained from the silicon compound particles in which the amount of the silicon component or Li silicate is relatively large based on the $SiO_2$ component. Note that the $^{29}$Si-MAS-NMR measurement can be performed under the following conditions.

$^{29}$Si MAS NMR (Magic Angle Spinning-Nuclear Magnetic Resonance)

Apparatus: a 700-NMR spectroscope made by Bruker Corp.,
Probe: a 4-mm HR-MAS rotor, 50 μL,
Sample Spinning Speed: 10 kHz,
Measurement Environment Temperature: 25° C.

Moreover, in the inventive negative electrode active material, each of the negative electrode active material particles preferably has a surface layer portion containing a carbon material. The negative electrode active material particles improve the electric conductivity by containing a carbon material in the surface layer portions. Accordingly, when such a negative electrode active material is used for a secondary battery, the battery characteristics can be improved. Additionally, contact between the silicon compound particles and water can be suppressed in an aqueous negative electrode slurry, so that the lithium compound elution can be suppressed.

Furthermore, the carbon material of the surface layer portion of each negative electrode active material particle preferably has an average thickness of 10 nm or more and 1000 nm or less. When the average thickness of the carbon material is 10 nm or more, the electric conductivity is improved. When the average thickness of the carbon material for covering is 1000 nm or less, it is possible to prevent lowering of the battery capacity by using the negative electrode active material containing such negative electrode active material particles for a lithium ion secondary battery.

The average thickness of this carbon material can be calculated by the following procedure, for example. First, the negative electrode active material particles are observed through TEM (transmission electron microscope) at an optional magnification. This magnification is preferably a magnification by which the thickness of the carbon material can be determined visually so as to measure the thickness. Subsequently, the thicknesses of the carbon material are measured at 15 random points. In this case, it is preferable to set the measuring points as widely and randomly as possible without focusing a particular place. Lastly, the average value of the thicknesses of the carbon material at the 15 points is calculated.

The covering rate of the carbon material is not particularly limited, but is desirable to be as high as possible. The covering rate of 30% or more improves the electric conductivity further, and is preferable. The covering method with the carbon material is not particularly limited, but a method of carbonizing saccharide and a pyrolysis method of hydrocarbon gas are preferable since these can improve the covering rate.

The negative electrode active material particles preferably have a median diameter (D50: the particle diameter when the accumulated volume becomes 50%) of 1.0 μm or more and 15 μm or less and a BET specific surface area of 1 $m^2/g$ or more and 5 $m^2/g$ or less. When the median diameter of the negative electrode active material particles is in the above range, lithium ions are easily occluded and released in charging and discharging, and the negative electrode active material particles become less liable to break. When the median diameter is 1.0 μm or more, it is possible to decrease the surface area per mass of the negative electrode active material particles to prevent increase of the irreversible battery capacity. Meanwhile, when the median diameter is 15 μm or less, the particles become less liable to break, thereby being prevented from forming a new surface. Further, when the specific surface area is 1 $m^2/g$ or more, the effect of stabilizing the aqueous negative electrode slurry by the phosphate can be obtained. Meanwhile, when the specific surface area is 5 $m^2/g$ or less, the lithium compound elution in the aqueous negative electrode slurry can be suppressed.

<Negative Electrode for Non-Aqueous Electrolyte Secondary Battery>

Figure 1:
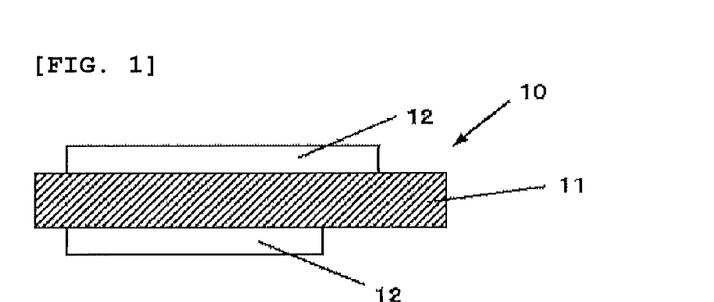
FIG. 1 is a sectional view showing a configuration example of a negative electrode for a non-aqueous electrolyte secondary battery, which contains the inventive negative electrode active material.

Next, a negative electrode for a non-aqueous electrolyte secondary battery (hereinafter, also referred to as "negative electrode") containing the inventive negative electrode active material will be described. FIG. 1 is a sectional view showing a configuration example of the negative electrode for a non-aqueous electrolyte secondary battery, which contains the inventive negative electrode active material.

[Configuration of Negative Electrode]

As shown in FIG. 1, a negative electrode 10 is constituted to have a negative electrode active material layer 12 on a negative electrode current collector 11. The negative electrode active material layer 12 may be disposed on both sides or only one side of the negative electrode current collector 11. Further, as long as the inventive negative electrode active material is used, the negative electrode current collector 11 is not essential.

[Negative Electrode Current Collector]

The negative electrode current collector 11 is made of a highly electric conductive and mechanically strong material. Examples of the electric conductive material usable for the negative electrode current collector 11 include copper (Cu) and nickel (Ni). This electric conductive material is preferably a material that does not form an intermetallic compound with lithium (Li).

The negative electrode current collector 11 preferably contains carbon (C) and sulfur (S) besides the main element because these elements improve the physical strength of the negative electrode current collector. In particular, when an active material layer that expands in charging is disposed, the current collector containing the above elements has an effect of suppressing deformation of the electrode including the current collector. Each content of the contained elements is not particularly limited, but is preferably 100 ppm by mass or less. This is because a higher effect of suppressing deformation is obtained. Such an effect of suppressing deformation can further improve the cycle characteristics.

Additionally, the surface of the negative electrode current collector 11 may or may not be roughened. Examples of the roughened negative electrode current collector include a metallic foil subjected to an electrolyzing process, an embossing process, or a chemical etching process; etc. Examples of the negative electrode current collector that is not roughened include a rolled metallic foil, etc.

[Negative Electrode Active Material Layer]

The negative electrode active material layer 12 contains the inventive negative electrode active material. Considering battery design, other materials may be further contained, such as a negative electrode binding agent (binder) or a conductive assistant agent. The inventive negative electrode active material contains: negative electrode active material particles capable of occluding and releasing lithium ions; and a phosphate.

Further, the negative electrode active material layer 12 may contain a mixed negative electrode active material that contains: the inventive negative electrode active material and a carbon-based active material. Incorporating a carbon-based active material makes it possible to decrease the electric resistance of the negative electrode active material layer and to ease the expanding stress due to charging. Examples of usable carbon-based active materials include pyrolytic carbons, cokes, glassy carbon fiber, calcined organic polymer compounds, carbon black, etc. In addition, the battery capacity can be increased by mixing the silicon-based active material with the carbon-based active material.

Moreover, in the mixed negative electrode active material, the mass ratio of the silicon-based active material is preferably 6 mass % or more relative to the sum of masses of the negative electrode active material and the carbon-based active material. When the mass ratio of the silicon-based active material is 6 mass % or more relative to the sum of masses of the silicon-based active material and the carbon-based active material, it is possible to surely improve the battery capacity.

Further, the inventive negative electrode active material contains silicon compound particles as described above. The silicon compound particles are each a silicon oxide material containing a silicon compound ($SiO_x$: 0.5≤x≤1.6). In this composition, "x" is preferably close to 1 because higher cycle characteristics are obtained. Note that the composition of the silicon compound in the present invention does not necessarily mean purity of 100%, and may contain a small quantity of impurity elements.

Furthermore, in the inventive negative electrode active material, each silicon compound particle contains at least one or more of $Li_2SiO_3$ and $Li_2Si_2O_5$. These are $SiO_2$ components in a silicon compound which become unstable upon insertion and release of lithium when a battery is charged and discharged. Thus, these components are modified to other lithium silicates in advance, so that the irreversible capacity generated in charging can be reduced.

In addition, when at least one or more of $Li_2SiO_3$ and $Li_2Si_2O_5$ are present in the bulk of the silicon compound particles, the battery characteristics are improved. Nevertheless, when the two Li compounds are co-present, the battery characteristics are further improved. Note that these lithium silicates can be quantified by NMR (Nuclear Magnetic Resonance) or XPS (X-ray photoelectron spectroscopy). The XPS and NMR measurements can be performed under the following conditions, for example.

XPS
  Apparatus: an X-ray photoelectron spectrometer,
  X-ray Source: a monochromatic Al Kα line,
  X-ray Spot Diameter: 100 μm,
  Ar-ion Gun Sputtering Conditions: 0.5 kV/2 mm×2 mm.
$^{29}$Si MAS NMR (Magic Angle Spinning-Nuclear Magnetic Resonance)
  Apparatus: a 700-NMR spectroscope made by Bruker Corp.,
  Probe: a 4-mm HR-MAS rotor, 50 μL,
  Sample Spinning Speed: 10 kHz,
  Measurement Environment Temperature: 25° C.

Additionally, as the negative electrode binder contained in the negative electrode active material layer, any one or more of polymer material, synthetic rubber, and so on are usable, for example. Examples of the polymer material include polyvinylidene fluoride, polyimide, polyamideimide, aramid, polyacrylic acid, lithium polyacrylate, carboxymethyl cellulose, etc. Examples of the synthetic rubber include styrene-butadiene rubber, fluororubber, ethylene-propylene-diene, etc.

As the negative electrode conductive assistant agent, any one or more of carbon materials, such as carbon black, acetylene black, graphite, ketjen black, carbon nanotube, and carbon nanofiber are usable, for example.

The negative electrode active material layer is formed by an application method, for example. The application method is a method in which: negative electrode active material particles are mixed with the above binder and so on, and optionally with a conductive assistant agent or carbon-based active material particles; and the resulting negative electrode active material is dispersed to organic solvent, water, or the like so as to be applied to a negative electrode current collector or the like.

[Methods of Producing Negative Electrode Active Material and Negative Electrode]

The negative electrode active material and the negative electrode can be produced by the following procedures, for example. First, a method for producing a negative electrode active material used for the negative electrode will be described.

In the beginning, silicon compound particles containing a silicon compound ($SiO_x$: $0.5 \leq x \leq 1.6$) are prepared. Next, Li is inserted into the silicon compound particles to incorporate at least one or more of $Li_2SiO_3$ and $Li_2Si_2O_5$. In this manner, negative electrode active material particles are prepared. Next, the prepared negative electrode active material particles are mixed with a phosphate to produce a negative electrode active material.

More specifically, the negative electrode active material can be produced as follows. First, a raw material which generates silicon oxide gas is heated in the presence of inert gas under reduced pressure in a temperature range of 900° C. to 1600° C. to generate silicon oxide gas. In consideration of the existence of oxygen on the surface of the metallic silicon powder and slight oxygen in a reaction furnace, the mixing mole ratio is desirably in a range of 0.8<metallic silicon powder/silicon dioxide powder<1.3.

The generated silicon oxide gas is solidified and deposited on an absorbing plate. Subsequently, the deposit of silicon oxide is taken out under the condition of the temperature in the reaction furnace being lowered to 100° C. or below. The deposit is then ground and powdered using a ball mil, a jet mil, or the like. Thus obtained powder may be classified. In the present invention, the distribution of particle size of the silicon compound particles can be controlled in the pulverization step and the classification step. As described above, the silicon compound particles can be prepared. Note that the Si crystallites in the silicon compound particles can be controlled by changing the evaporation temperature or a heat treatment after the preparation.

Here, on the surface layer of the silicon compound particle, a carbon material layer may be formed. As a method to form the carbon material layer, a thermal decomposition CVD method is desirable. A method for forming a carbon material layer by thermal decomposition CVD method will be described.

First, the silicon compound particles are set in a furnace. Then, a hydrocarbon gas is introduced into the furnace, and the temperature in the furnace is raised. The pyrolysis temperature is not particularly limited, but is preferably 1200° C. or less, more preferably 950° C. or less. When the pyrolysis temperature is 1200° C. or less, it is possible to prevent unintentional disproportionation of the negative electrode active material particles. After raising the furnace temperature to a prescribed temperature, a carbon layer is formed on the surface of the silicon compound particle. Additionally, the hydrocarbon gas to be the raw material of the carbon material is not particularly limited, but preferably has a composition of $C_nH_m$ where $n \leq 4$. When $n \leq 4$, it is possible to decrease the production cost and to improve the properties of the decomposition products.

Next, Li is inserted into the silicon compound particles prepared as described above so as to include at least one or more of $Li_2SiO_3$ and $Li_2Si_2O_5$. Li is preferably inserted by a thermal doping method.

In the modification by the thermal doping method, the modification is possible, for example, by mixing the silicon compound particles with LiH powder or Li powder, followed by heating under a non-oxidizing atmosphere. As the non-oxidizing atmosphere, for example, Ar atmosphere or the like may be used. More specifically, first, under an Ar atmosphere, the silicon oxide powder is sufficiently mixed with LiH powder or Li powder, and sealed. The whole sealed vessel is stirred to make the mixture uniform. Then, the mixture is heated in a range of 700° C. to 750° C. for the modification. In this event, in order to release a portion of active Li from the silicon compound to further stabilize the slurry, the heated powder may be sufficiently cooled and then washed with alcohol, alkaline water, weak acid, or pure water.

Alternatively, Li may be inserted into the silicon compound particles by an oxidation-reduction method. In the modification by the oxidation-reduction method, for example, first, lithium is dissolved in an ether solvent to prepare a solution A. The silicon compound particles are immersed in the solution A, so that lithium can be inserted. The solution A may further contain a polycyclic aromatic compound or a linear polyphenylene compound. After the lithium insertion, the silicon compound particles may be immersed in a solution B containing a polycyclic aromatic compound or a derivative thereof to release active lithium from the silicon compound particles. As a solvent of the solution B, for example, an ether-based solvent, a ketone-based solvent, an ester-based solvent, an alcohol-based solvent, an amine-based solvent, or a mixed solvent thereof can be used. Further, after immersed in the solution B, the silicon compound particles may be immersed in a solution C containing an alcohol-based solvent, a carboxylic acid-based solvent, water, or a mixed solvent thereof, to release a larger amount of active lithium from the silicon compound particles. Alternatively, instead of the solution C, it is possible to use a solution C' which contains: a compound having a quinoid structure in the molecule as a solute, and an ether-based solvent, a ketone-based solvent, an ester-based solvent, or a mixed solvent thereof as a solvent. Moreover, the silicon compound particles may be immersed in the solutions B, C, and C' repeatedly. As described above, after the lithium insertion, when active lithium is released, a negative electrode active material having higher water resistance is obtained. Then, washing may be performed, for example, by a washing method with alcohol, alkaline water in which lithium carbonate is dissolved, weak acid, pure water, or the like.

As the ether-based solvent used in the solution A, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, mixed solvents thereof, etc. Among these, tetrahydrofuran, dioxane, and 1,2-dimethoxy ethane are particularly preferably used. These solvents are preferably dehydrated, and preferably deoxygenized.

Moreover, as the polycyclic aromatic compound contained in the solution A, it is possible to use one or more kinds of naphthalene, anthracene, phenanthrene, naphthacene, pentacene, pyrene, picene, triphenylene, coronene, chrysene, and derivatives thereof. As the linear polyphenylene compound, it is possible to use one or more kinds of biphenyl, terphenyl, and derivatives thereof.

As the polycyclic aromatic compound contained in the solution B, it is possible to use one or more kinds of naphthalene, anthracene, phenanthrene, naphthacene, pentacene, pyrene, picene, triphenylene, coronene, chrysene, and derivatives thereof.

Moreover, as the ether-based solvent of the solution B, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, etc.

As the ketone-based solvent, it is possible to use acetone, acetophenone, etc.

As the ester-based solvent, it is possible to use methyl formate, methyl acetate, ethyl acetate, propyl acetate, isopropyl acetate, etc.

As the alcohol-based solvent, it is possible to use methanol, ethanol, propanol, isopropyl alcohol, etc.

As the amine-based solvent, it is possible to use methylamine, ethylamine, ethylenediamine, etc.

When the solution C is used, solvents may be mixed in multiple stages such that, for example, a ketone-based solvent and the silicon compound are mixed and stirred, and then the alcohol-based solvent is added.

As the alcohol-based solvent of the solution C, it is possible to use methanol, ethanol, propanol, isopropyl alcohol, etc.

As the carboxylic acid-based solvent, it is possible to use formic acid, acetic acid, oxalic acid, etc.

Moreover, when water is used as the solvent, an aqueous solution containing a solute may be used, such as ammonia water, lithium acetate aqueous solution, lithium carbonate aqueous solution, and lithium hydroxide aqueous solution, other than pure water.

Further, it is also possible to use a mixed solvent containing a combination of two or more among the alcohol-based solvents, carboxylic acid-based solvents, and water described above.

Figure 3:
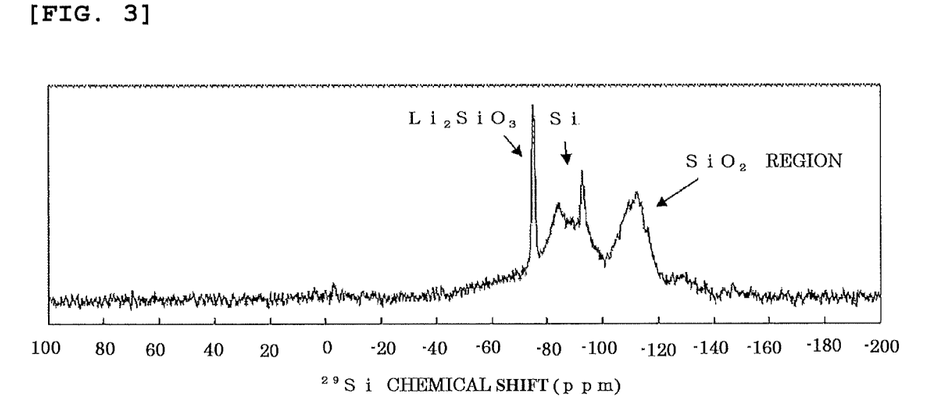
FIG. 3 is an example of a $^{29}$Si-MAS-NMR spectrum measured for silicon compound particles modified by thermal doping method.

Meanwhile, FIG. 3 shows an example of a $^{29}$Si-MAS-NMR spectrum measured for the silicon compound particles modified by the thermal doping method. In FIG. 3, a peak given around −75 ppm is a peak derived from $Li_2SiO_3$, and a broad peak given from −80 to −100 ppm is a peak derived from Si. Moreover, a peak given around −90 to −100 ppm is a peak derived from $Li_2Si_2O_5$.

Subsequently, the negative electrode active material particles containing the silicon compound particles are blended with a phosphate to produce a negative electrode active material that satisfies the ratio $m_p/m_l$ of $0.02 \leq m_p/m_l \leq 3$, where $m_l$ represents the molar quantity of the lithium element present on the surfaces of the negative electrode active material particles and contained per unit mass of the negative electrode active material particles, and $m_p$ represents the molar quantity of the phosphorus element contained per unit mass of the negative electrode active material particles. As the mixing method, dry mixing may be employed, such as mixing by stirring, rolling, or shearing; alternatively, wet mixing may be employed in which the phosphate dispersed in a solution is sprayed onto the negative electrode active material particles.

The amount of the phosphate blended into the negative electrode active material particles may be adjusted to control the ratio $(m_p/m_l)$ between the molar quantity $(m_l)$ of the lithium element present on the surfaces of the negative electrode active material particles and contained per unit mass of the negative electrode active material particles and the molar quantity $(m_p)$ of the phosphorus element contained per unit mass of the negative electrode active material particles.

In this regard, in the case where the carbon material layer is formed on the surface layers of the silicon compound particles, the lithium element present on the surfaces of the negative electrode active material particles also includes lithium element present on the surface of the carbon material on the surface layer portion of each negative electrode active material particle.

<Aqueous Negative Electrode Slurry Composition>

An aqueous negative electrode slurry composition can be obtained by: optionally mixing the negative electrode active material produced as described above with other materials, such as a negative electrode binding agent and a conductive assistant agent; and then adding an organic solvent, water, or the like.

Such an aqueous negative electrode slurry composition is capable of suppressing over-time changes due to, for example, gas generation during storage. This allows the production process to be designed quite freely and industrially suitable. Moreover, when this aqueous negative electrode slurry composition is used to prepare a negative electrode, a secondary battery having high capacity and favorable initial charge-discharge characteristics is successfully obtained.

Next, the aqueous negative electrode slurry composition is applied onto the surface of a negative electrode current collector and dried to form a negative electrode active material layer. In this event, heat pressing and so on may be performed as necessary. As described above, a negative electrode is successfully produced.

<Lithium-Ion Secondary Battery>

Next, a lithium-ion secondary battery containing the inventive negative electrode active material will be described. Here, a lithium-ion secondary battery of a laminate film type is described as a concrete example.

[Configuration of Laminate Film Type Lithium-Ion Secondary Battery]

Figure 4:
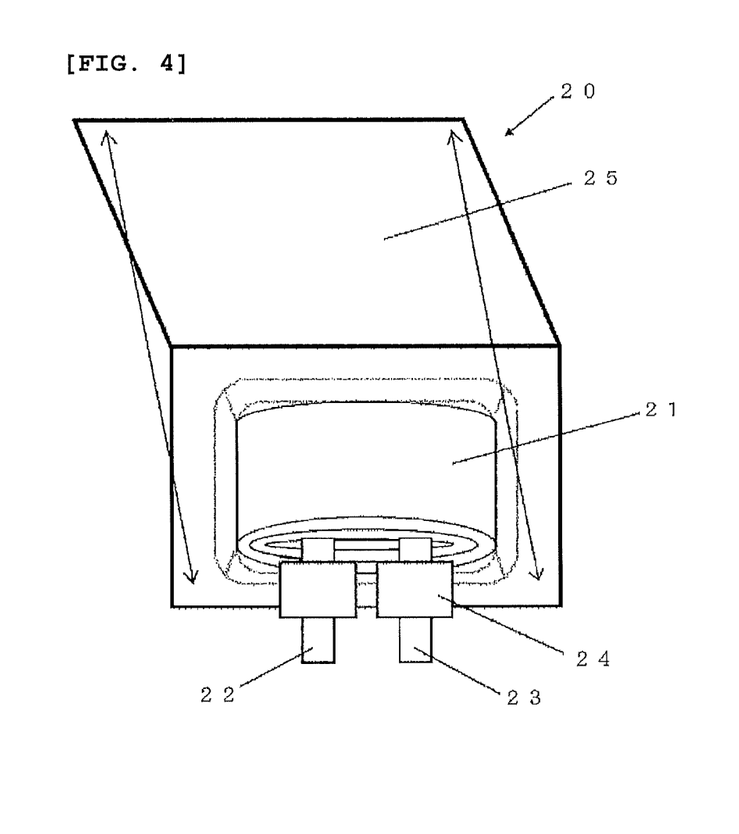
FIG. 4 is a view showing a configuration example (laminate film type) of a lithium secondary battery that contains the inventive negative electrode active material.

A laminate film type lithium-ion secondary battery 20 shown in FIG. 4 mainly includes a wound electrode body 21 stored in sheet-shaped outer parts 25. This wound body is formed by winding a positive electrode, a negative electrode, and a separator disposed between these electrodes. There is also a case storing a laminate having a separator disposed between a positive electrode and a negative electrode. The electrode bodies of both types have a positive-electrode lead 22 attached to the positive electrode and a negative-electrode lead 23 attached to the negative electrode. The outermost circumference of the electrode bodies is protected by a protecting tape.

The positive-electrode lead and the negative-electrode lead, for example, extend from the interior of the outer parts 25 toward the exterior in one direction. The positive-electrode lead 22 is made of, for example, a conductive material, such as aluminum. The negative-electrode lead 23 is made of, for example, a conductive material, such as nickel or copper.

An example of the outer part 25 is a laminate film composed of a fusion-bond layer, a metallic layer, and a surface protecting layer stacked in this order. Two laminate films are fusion-bonded or stuck with an adhesive or the like at the outer edges of their fusion-bond layers such that each fusion-bond layer faces the electrode body 21. The fusion-bond portion is for example a film, such as a polyethylene or polypropylene film. The metallic portion is aluminum foil, etc. The protecting layer is for example nylon, etc.

The space between the outer parts 25 and the positive- and negative-electrode leads is filled with close adhesion films 24 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector like the negative electrode 10 shown in FIG. 1, for example.

The positive electrode current collector is made of, for example, a conductive material, such as aluminum.

The positive electrode active material layer contains any one kind or two kinds or more of positive electrode materials capable of occluding and releasing lithium ions, and may contain a binding agent, a conductive assistant agent, a dispersing agent, or other materials according to design. The same detailed description as described for the negative electrode binding agents and negative electrode conductive assistant agent, for example, can be given for the binding agent and the conductive assistant agent in this case.

The positive electrode material is preferably a compound containing lithium. Examples of the lithium-containing compound include complex oxides each composed of lithium and a transition metal element, and phosphate compounds each containing lithium and a transition metal element. Among these mentioned positive electrode materials, a compound containing at least one of nickel, iron, manganese, and cobalt is preferable. The chemical formula of such compounds is expressed by, for example, $Li_xM1O_2$ or $Li_yM2PO_4$. In the formulae, M1 and M2 represent at least one kind of transition metal elements. "x" and "y" each represent a value varied depending on a charging or discharging status of a battery, which typically satisfy $0.05 \le x \le 1.10$ and $0.05 \le y \le 1.10$.

Examples of the complex oxides composed of lithium and a transition metal element include a lithium cobalt complex oxide ($Li_xCoO_2$), a lithium nickel complex oxide ($Li_xNiO_2$), etc. Examples of the phosphate compounds containing lithium and a transition metal element include a lithium iron phosphate compound ($LiFePO_4$), a lithium iron manganese phosphate compound ($LiFe_{1-u}Mn_uPO_4$ (0<u<1)), etc. This is because higher battery capacity and excellent cycle characteristics are obtained using these positive electrode materials.

[Negative Electrode]

The negative electrode has a configuration which is similar to that of the above negative electrode 10 for a lithium-ion secondary battery shown in FIG. 1, and, for example, has the negative electrode active material layers 12 disposed on both faces of the current collector 11. The negative electrode preferably has a negative-electrode charge capacity larger than electrical capacitance (battery charge capacity) provided by the positive electrode active material, for this negative electrode itself can suppress the precipitation of lithium metal.

The positive electrode active material layer is formed partially on both faces of the positive electrode current collector. The negative electrode active material layer is also formed partially on both faces of the negative electrode current collector. In this case, the negative electrode active material layer provided on the negative electrode current collector, for example, has a region which does not face any positive electrode active material layer. This intends to perform a stable battery design.

A non-facing area, that is, the above area at which the positive and negative electrode active material layers do not face one another is hardly affected by charging and discharging. The status of the negative electrode active material layer is consequently retained since its formation. This enables repeatable high-precision investigation of, for example, the composition of negative electrode active material without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramic, or two or more stacked porous films to give laminate structure. Examples of the synthetic resin include polytetrafluoroethylene, polypropylene, polyethylene, etc.

[Electrolytic Solution]

At least a part of the active material layers or the separator is impregnated with a liquid electrolyte (electrolytic solution). This electrolytic solution is composed of electrolyte salt dissolved in a solvent and may contain other materials such as additives.

The solvent to be used may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, tetrahydrofuran, etc. Among these, at least one or more of ethylene carbonate, propylene carbonate, dimethyl carbonate, diethyl carbonate, or ethylmethyl carbonate are preferably used because such solvent(s) enable better characteristics. In this case, superior characteristics can be obtained by combined use of a high-viscosity solvent, such as ethylene carbonate or propylene carbonate, and a low-viscosity solvent, such as dimethyl carbonate, ethylmethyl carbonate, or diethyl carbonate because the dissociation of electrolyte salt and ionic mobility are improved.

When an alloyed negative electrode is used, the solvent particularly preferably contains at least one of halogenated chain carbonate ester and halogenated cyclic carbonate ester. Such a solvent enables the negative electrode active material to be coated with a stable coating at charging or discharging, particularly charging. The halogenated chain carbonate ester is chain carbonate ester having halogen as a constituent element (at least one hydrogen is substituted by halogen). Moreover, the halogenated cyclic carbonate ester is cyclic carbonate ester having halogen as a constituent element (i.e., at least one hydrogen is substituted by halogen).

The kind of halogen is not particularly limited, but fluorine is preferable. This is because fluorine enables the formation of better coating than other halogens do. A larger number of halogens are better because a more stable coating can be obtained which reduces a decomposition reaction of the electrolytic solution.

Examples of the halogenated chain carbonate ester include fluoromethyl methyl carbonate, difluoromethyl methyl carbonate, etc. Examples of the halogenated cyclic carbonate ester include 4-fluoro-1,3-dioxolane-2-one, 4,5-difluoro-1,3-dioxolane-2-one, etc.

The solvent preferably contains an unsaturated carbon bond cyclic carbonate ester as an additive because this enables the formation of a stable coating on the negative electrode surface at charging and discharging and the inhibition of a decomposition reaction of the electrolytic solution. Examples of the unsaturated carbon bond cyclic carbonate ester include vinylene carbonate, vinyl ethylene carbonate, etc.

In addition, the solvent preferably contains sultone (cyclic sulfonic acid ester) as an additive because this enables improvement in chemical stability of a battery. Examples of the sultone include propane sultone and propene sultone.

In addition, the solvent preferably contains acid anhydride because this enables improvement in chemical stability of the electrolytic solution. An example of the acid anhydride includes propane disulfonic acid anhydride.

The electrolyte salt may contain, for example, at least one light metal salt, such as lithium salt. Examples of the lithium salt include lithium hexafluorophosphate ($LiPF_6$), lithium tetrafluoroborate ($LiBF_4$), etc.

The content of the electrolyte salt in the solvent is preferably 0.5 mol/kg or more and 2.5 mol/kg or less. This content enables high ionic conductivity.

[Method of Producing Laminate Film Type Secondary Battery]

The present invention makes it possible to produce a negative electrode using a negative electrode active material produced by the inventive method for producing a negative electrode active material described above, and to produce a lithium-ion secondary battery using the produced negative electrode.

In the beginning, a positive electrode is produced with the above positive electrode material. A positive electrode mixture is first created by mixing the positive electrode active material with as necessary the binding agent, the conductive assistant agent, and other materials, and then dispersed in an organic solvent to form slurry of the positive-electrode mixture. Subsequently, the mixture slurry is applied to a positive electrode current collector with a coating apparatus such as a die coater having a die head or a knife roll, and dried by hot air to obtain a positive electrode active material layer. The positive electrode active material layer is finally compressed with, for example, a roll press. In this event, heating may be performed, and the heating or the compression may be repeated multiple times.

Secondly, a negative electrode active material layer is formed on a negative electrode current collector to produce a negative electrode through the same procedure as in the above production of the negative electrode 10 for a lithium-ion secondary battery.

In producing the positive electrode and the negative electrode, the active material layers are formed on both faces of the positive and negative electrode current collectors. In this event, in both the electrodes, the length of these active material layers formed on the faces may differ from one another (see FIG. 1).

Then, an electrolytic solution is prepared. Subsequently, with ultrasonic welding or the like, the positive-electrode lead 22 is attached to the positive electrode current collector and the negative-electrode lead 23 is attached to the negative electrode current collector. Then, the positive and negative electrodes and the separator interposed therebetween are stacked or wound to produce the wound electrode body 21 and a protecting tape is stuck to the outermost circumference of the body. Next, the wound body is flattened. Subsequently, the film-shaped outer part 25 is folded in half to interpose the wound electrode body therebetween. The insulating portions of the outer parts are stuck to one another by heat sealing, thereby the wound electrode body is encapsulated with one direction being opened. The close-adhesion films are inserted between the outer parts and the positive- and negative-electrode leads. The prepared electrolytic solution is introduced in a prescribed amount from the opened side to perform the impregnation of the electrolytic solution under a vacuum. After the impregnation, the opened side is stuck by vacuum heat sealing. In this manner, the laminate film type lithium-ion secondary battery 20 is successfully produced.

EXAMPLE

Hereinafter, the present invention will be more specifically described by showing Examples of the present invention and Comparative Examples. However, the present invention is not limited to these Examples.

Example 1-1

The laminate film type lithium-ion secondary battery 20 shown in FIG. 4 was prepared by the following procedure.

The procedure began with the production of a positive electrode. A positive-electrode mixture was prepared by mixing 95 mass % of $LiNi_{0.7}Co_{0.25}Al_{0.05}O$ of lithium-nickel-cobalt complex oxide as a positive electrode active material, 2.5 mass % of a positive electrode conductive assistant agent, and 2.5 mass % of a positive electrode binder (polyvinylidene fluoride: PVDF). Then, the positive-electrode mixture was dispersed in an organic solvent (N-methyl-2-pyrrolidone: NMP) to form paste slurry. The slurry was subsequently applied to both surfaces of a positive electrode current collector with a coating apparatus having a die head and dried with a drying apparatus of hot-air type. The positive electrode current collector used here had a thickness of 15 μm. The resultant was finally compressed with a roll press.

Next, a negative electrode was produced. In the beginning, a negative electrode active material was produced as follows. A mixed raw material of metallic silicon and silicon dioxide was introduced into a reaction furnace and evaporated in an atmosphere with a vacuum degree of 10 Pa to deposit the evaporated material on an adsorption plate. The deposit was sufficiently cooled and then taken out to pulverize the deposit with a ball mill. In thus obtained silicon compound particles, the value of "x" in $SiO_x$ was 0.5. Subsequently, the silicon compound particles were classified to adjust the particle sizes. Then, thermal decomposition CVD was performed to coat the surfaces of the silicon compound particles with carbon material.

Subsequently, the silicon compound particles were modified through lithium insertion by the thermal doping method. First, under an Ar atmosphere, the silicon compound particles were sufficiently mixed with LiH powder, followed by sealing. The whole sealed vessel was stirred so as to make the mixture uniform. Then, the mixture was heated in a range of 700° C. to 750° C. for the modification. Thus, negative electrode active material particles were obtained.

Next, aluminum phosphate tribasic was subjected to an X-ray diffraction spectrum measurement, and confirmed to have a cristobalite-type crystal structure. The position of the main peak was 21.7°. This cristobalite-type aluminum phosphate tribasic was blended with the negative electrode active material particles to prepare a negative electrode active material. The mass ratio of the aluminum phosphate tribasic in this negative electrode active material was 0.3 mass %. Dry mixing was performed with a stirrer for 10 minutes to uniformly mix the negative electrode active material particles and the phosphate.

Next, the mixed negative electrode active material was dissolved in a solution in which hydrofluoric acid and nitric acid had been mixed in a ratio of 1:1. Quantification was performed with ICP-OES to determine the molar quantity ($m_p$) of the phosphorus element contained in the negative electrode active material particles. Moreover, the mixed negative electrode active material was dispersed in water, and this aqueous dispersion was filtered. The resulting filtrate was subjected to quantification with ICP-OES to determine the molar quantity ($m_l$) of the lithium element present on the surfaces of the negative electrode active material particles. From the determined molar quantity ($m_l$) of the lithium element present on the surfaces of the negative electrode active material particles and molar quantity ($m_p$) of the phosphorus element contained in the negative electrode active material particles, the ratio $m_p/m_l$ was calculated. As a result, the molar quantity ($m_p$) of the phosphorus element contained in the negative electrode active material particles was $2.2 \times 10^{-5}$ mol/g, and the molar quantity ($m_l$) of the lithium element present on the surfaces of the negative electrode active material particles was $1.1 \times 10^{-4}$ mol/g. Further, the ratio $m_p/m_l$ was 0.2 according to the calculation.

Furthermore, the mixed negative electrode active material was dispersed in a proportion of 10 mass % in pure water. The pH of the resulting dispersion was measured with a pH meter. As a result, the pH of the dispersion was 12.0.

Next, the negative electrode active material was blended with a carbon-based active material such that the mass ratio of the silicon-based active material particles and carbon-based active material particles was 1:9 to produce a mixed negative electrode active material. The carbon-based active material used herein was a mixture in which artificial graphite and natural graphite coated with a pitch layer were mixed in a mass ratio of 5:5. Additionally, the carbon-based active material had a median diameter of 20 μm.

Next, the mixed negative electrode active material, conductive assistant agent-1 (carbon nanotube, CNT), conductive assistant agent-2 (carbon fine particles with a median diameter of about 50 nm), styrene-butadiene rubber (styrene-butadiene copolymer; hereinafter, referred to as SBR), and carboxymethyl cellulose (hereinafter, referred to as CMC) were mixed in a dry mass ratio of 92.5:1:1:2.5:3. This was diluted with pure water to form aqueous negative electrode slurry. Incidentally, the foregoing SBR and CMC were negative electrode binders (negative electrode binding agents).

As a negative electrode current collector, an electrolytic copper foil with a thickness of 15 μm was used. This electrolytic copper foil contained carbon and sulfur each at a concentration of 70 ppm by mass. Finally, the negative-electrode mixture slurry was applied onto the negative electrode current collector, and dried at 100° C. for 1 hour in a vacuum atmosphere. After drying, the negative electrode had a deposited amount of a negative electrode active material layer per unit area at one side (also referred to as an area density) of 5 mg/cm².

Next, solvents (4-fluoro-1,3-dioxolane-2-one (FEC), ethylene carbonate (EC), and dimethyl carbonate (DMC), were mixed, followed by dissolving electrolyte salt (lithium hexafluorophosphate: $LiPF_6$) to prepare an electrolytic solution. In this case, the solvent composition was set to FEC:EC:DMC=10:20:70 in a volume ratio, and the content of the electrolyte salt was set to 1.2 mol/kg based on the solvents.

Then, a secondary battery was assembled as follows. First, an aluminum lead was attached to one end of the positive electrode current collector by ultrasonic welding, and a nickel lead was welded to one end of the negative electrode current collector. Subsequently, the positive electrode, a separator, the negative electrode, and a separator were laminated in this order, and wound in the longitudinal direction to produce a wound electrode body. The end of the winding portion was fixed with a PET protecting tape. The separator used herein was a laminate film (thickness: 12 μm) in which a film mainly composed of porous polyethylene was sandwiched by films mainly composed of porous polypropylene. Thereafter, the electrode body was put between outer parts, and then peripheries excluding one side were hot melted, and thereby the electrode body was stored in the outer parts. As the outer part, an aluminum laminate film was used in which a nylon film, an aluminum foil, and a polypropylene film were laminated. Then, the prepared electrolytic solution was introduced from the opening to perform the impregnation under a vacuum atmosphere. The opening was then stuck by heat sealing.

The first time charge-discharge characteristics of the secondary battery thus prepared were evaluated.

In investigating the first time charge-discharge characteristics, the first time efficiency (hereinafter, may also be referred to as initial efficiency) was calculated. The first time efficiency was calculated from the equation shown by: first time efficiency (%)=(first time discharge capacity/first time charge capacity)×100. The atmospheric temperature was the same as that in investigating the cycle characteristics.

In addition, the slurry stability was evaluated as pot life based on the time till a gas was generated from the slurry. It can be said that the longer the time, the more stable the slurry is. Specifically, 10 g of the prepared slurry was separated and sealed in an aluminum laminate pack. The volume was measured by Archimedes method immediately after the preparation (0 hours later), 6 hours later, 24 hours later, 48 hours later, 72 hours later, 96 hours later, 120 hours later, 144 hours later, and 168 hours later. It was determined that gas was generated when the change in volume immediately after the preparation exceeded 1 ml. The measurements were performed under storage temperature conditions of 20° C. and 40° C.

Examples 1-2 to 1-3, Comparative Examples 1-1, 1-2

Secondary batteries were produced as in Example 1-1, except for adjusting the oxygen amount in the bulk of the silicon compound. In these events, the oxygen amount was adjusted by changing the heating temperature or the ratio of metallic silicon and silicon dioxide in the raw material of the silicon compound. Each "x" value of the silicon compound shown by $SiO_x$ in Examples 1-1 to 1-3 and Comparative Examples 1-1 and 1-2 is shown in Table 1.

In this case, the silicon-based active material particles in Examples 1-1 to 1-3 and Comparative Examples 1-1 and 1-2 had properties as follows. In the negative electrode active material particles, the silicon compound particles contained $Li_2SiO_3$ and $Li_2Si_2O_5$. Moreover, the silicon compounds each had a diffraction peak attributable to a Si(220) crystal face obtained from the X-ray diffraction, and the half value width (2θ) of the diffraction peak was 1.7°. The size of the crystallite attributable to the Si(220) crystal face was 5 nm. In addition, the average thickness of the carbon material which covered the surface was 40 nm. Moreover, the negative electrode active material particles had a median diameter of 6 μm. Further, the negative electrode active material particles had a BET specific surface area of 3.1 m²/g.

Furthermore, in all of Examples and Comparative Examples above, peaks in the Si and Li silicate regions given as the chemical shift value of −60 to −95 ppm appeared which were obtained from the $^{29}$Si-MAS-NMR spectra. Moreover, in all of Examples and Comparative Examples above, the relation of A>B was satisfied where A is the maximum peak intensity value in the Si and Li silicate regions given as the chemical shift value of −60 to −95 ppm, and B is the peak intensity value in the $SiO_2$ region given as the chemical shift value of −96 to −150 ppm, the values being obtained from the $^{29}$Si-MAS-NMR spectra.

Table 1 shows the evaluation results of Examples 1-1 to 1-3 and Comparative Examples 1-1, 1-2.

TABLE 1

$SiO_x$, $D_{50}$ = 6 μm; graphite (natural graphite:artificial graphite = 5:5), $D_{50}$ = 20 μm; SiOx ratio: 10 mass %; Li compound: [$Li_2SiO_3$, $Li_2Si_2O_5$]; carbon material average thickness: 40 nm; specific surface area: 3.1 m²/g; half value width of Si(220) face in XRD: 1.7°, Si crystallite: 5 nm; modification method: thermal doping; NMR peaks: A > B; phosphate: $AlPO_4$; $m_p$ = 2.2 × 10⁻⁵, $m_1$ = 1.1 × 10⁻⁴, $m_p/m_1$ = 0.2; cristobalite type; dispersion pH: 12.0

|  | x | First time efficiency | 20° C. Pot life (hr) | 40° C. Pot life (hr) |
|---|---|---|---|---|
| Comparative Example 1-1 | 0.3 | 86.5% | 168< | 6 |
| Example 1-1 | 0.5 | 87.7% | 96 | 48 |
| Example 1-2 | 0.9 | 88.1% | 168< | 144 |
| Example 1-3 | 1.6 | 87.2% | 168< | 168 |
| Comparative Example 1-2 | 1.8 | — | — | — |

As shown in Table 1, when the value of "x" in the silicon compound shown by SiOx was out of the range of 0.5≤x≤1.6, the battery characteristics or slurry stability were lowered. For example, when oxygen was insufficient (x=0.3) as shown in Comparative Example 1-1, the pot life of the slurry stored at 40° C. was significantly lowered. On the other hand, as shown in Comparative Example 1-2, larger oxygen amount (x=1.8) decreased the electric conductivity and failed to substantially exhibit the capacity of the silicon oxide, and the evaluation had to be stopped thereby.

Examples 2-1, 2-2

Secondary batteries were prepared under the same conditions as in Example 1-2, except for changing the kind of lithium silicate to be incorporated inside the silicon compound particles as shown in Table 2. The cycle characteristics and first time efficiency were then evaluated.

Comparative Example 2-1

A secondary battery was prepared under the same conditions as in Example 1-2, except that lithium was not inserted into the silicon compound particles. The first time efficiency and slurry stability were then evaluated.

Table 2 shows the results of Examples 2-1, 2-2 and Comparative Example 2-1.

TABLE 2

SiOx (x = 0.9); $D_{50}$ = 6 μm; graphite (natural graphite:artificial graphite = 5:5), $D_{50}$ = 20 μm; SiOx ratio: 10 mass %; carbon material average thickness: 40 nm; specific surface area: 3.1 m²/g; half value width of Si(220) face in XRD: 1.7°, Si crystallite: 5 nm; modification method: thermal doping; NMR peaks: A > B; phosphate: AlPO$_4$; $m_p$ = 2.2 × 10$^{-5}$, $m_1$ = 1.1 × 10$^{-4}$, $m_p/m_1$ = 0.2; cristobalite type; dispersion pH: 12.0

| | Lithium silicate | First time efficiency | 20° C. Pot life (hr) | 40° C. Pot life (hr) |
|---|---|---|---|---|
| Example 2-1 | Li$_2$SiO$_3$ | 87.4% | 168< | 144 |
| Example 2-2 | Li$_2$Si$_2$O$_5$ | 86.9% | 144 | 72 |
| Example 1-2 | Li$_2$SiO$_3$, Li$_2$Si$_2$O$_5$ | 88.1% | 168< | 144 |
| Comparative Example 2-1 | — | 83.1% | 168< | 168< |

When the silicon compound contained stable lithium silicate such as Li$_2$SiO$_3$ and Li$_2$Si$_2$O$_5$, the capacity retention rate and initial efficiency were improved. Particularly, when both lithium silicates Li$_2$SiO$_3$ and Li$_2$Si$_2$O$_5$ were incorporated, the initial efficiency was further improved, and the slurry pot life was also favorable. On the other hand, in Comparative Example 2-1 in which the silicon compound was not modified and did not contain lithium, the initial efficiency was decreased.

Examples 3-1 to 3-6, Comparative Examples 3-1 to 3-3

Secondary batteries were prepared under the same conditions as in Example 1-2, except that the ratio $m_p/m_l$ was adjusted as shown in Table 3, where ($m_l$) is a molar quantity of lithium element present on the surfaces of the negative electrode active material particles and contained per unit mass of the negative electrode active material particles, and ($m_p$) is a molar quantity of phosphorus element contained per unit mass of the negative electrode active material particles. The first time efficiency and slurry stability were then evaluated.

Examples 3-7 to 3-10

Secondary batteries were prepared under the same conditions as in Example 1-1, except that the ratio $m_p/m_l$ was adjusted as in Table 3. The first time efficiency and slurry stability were then evaluated (Examples 3-7, 3-8). Moreover, secondary batteries were prepared under the same conditions as in Example 1-3, except that the ratio $m_p/m_l$ was adjusted as in Table 3. The first time efficiency and slurry stability were then evaluated (Examples 3-9, 3-10).

Table 3 shows the results of Examples 3-1 to 3-10 and Comparative Examples 3-1 to 3-3.

TABLE 3

$D_{50}$ = 6 μm; graphite (natural graphite:artificial graphite = 5:5), $D_{50}$ = 20 μm; SiOx ratio: 10 mass %; Li compound: [Li$_2$SiO$_3$, Li$_2$Si$_2$O$_5$]; carbon material average thickness: 40 nm; specific surface area: 3.1 m²/g; half value width of Si(220) face in XRD: 1.7°, Si crystallite: 5 nm; modification method: thermal doping; NMR peaks: A > B; phosphate: AlPO$_4$, cristobalite type; dispersion pH: 12.0

| Table 3 | x | $m_p$ (mol/g) | $m_l$ (mol/g) | $m_p/m_l$ | First time efficiency | 20° C. Pot life (hr) | 40° C. Pot life (hr) |
|---|---|---|---|---|---|---|---|
| Comparative Example 3-1 | 0.9 | 0 | 1.1 × 10$^{-4}$ | 0 | 86.8% | 24 | 6 |
| Comparative Example 3-2 | 0.9 | 1.1 × 10$^{-6}$ | 1.1 × 10$^{-4}$ | 0.01 | 87.2% | 24 | 6 |
| Example 3-1 | 0.9 | 2.2 × 10$^{-6}$ | 1.1 × 10$^{-4}$ | 0.02 | 88.1% | 96 | 48 |
| Example 3-2 | 0.9 | 7.7 × 10$^{-6}$ | 1.1 × 10$^{-4}$ | 0.07 | 88.4% | 168< | 96 |
| Example 1-2 | 0.9 | 2.2 × 10$^{-5}$ | 1.1 × 10$^{-4}$ | 0.2 | 88.1% | 168< | 144 |
| Example 3-3 | 0.9 | 6.6 × 10$^{-5}$ | 1.1 × 10$^{-4}$ | 0.6 | 88.1% | 168< | 144 |
| Example 3-4 | 0.9 | 8.8 × 10$^{-5}$ | 1.1 × 10$^{-4}$ | 0.8 | 88.3% | 168< | 120 |
| Example 3-5 | 0.9 | 9.9 × 10$^{-5}$ | 1.1 × 10$^{-4}$ | 0.9 | 87.4% | 120 | 48 |
| Example 3-6 | 0.9 | 3.3 × 10$^{-4}$ | 1.1 × 10$^{-4}$ | 3.0 | 87.3% | 96 | 48 |
| Comparative Example 3-3 | 0.9 | 3.8 × 10$^{-4}$ | 1.1 × 10$^{-4}$ | 3.5 | 87.1% | 48 | 6 |
| Example 3-7 | 0.5 | 2.2 × 10$^{-6}$ | 1.1 × 10$^{-4}$ | 0.02 | 87.3% | 72 | 48 |
| Example 3-8 | 0.5 | 3.3 × 10$^{-4}$ | 1.1 × 10$^{-4}$ | 3.0 | 87.7% | 120 | 48 |
| Example 3-9 | 1.6 | 2.2 × 10$^{-6}$ | 1.1 × 10$^{-4}$ | 0.02 | 87.4% | 120 | 72 |
| Example 3-10 | 1.6 | 3.3 × 10$^{-4}$ | 1.1 × 10$^{-4}$ | 3.0 | 87.0% | 96 | 48 |

As can be seen from Table 3, when the ratio $m_p/m_l$ was within the range of 0.02 or more and 3 or less, the pot life of the slurry was greatly improved. Moreover, when the ratio $m_p/m_l$ was within the range of 0.07 or more and 0.8 or less, the pot life under the storage at 40° C. was extended, and the slurry stability was particularly improved.

Meanwhile, when the ratio $m_p/m_l$ was out of the range of 0.02 or more and 3 or less as in Comparative Examples 3-1 to 3-3, the slurry stability was lowered. Particularly, gas generation was observed within 6 hours under the storage at 40° C. in any case.

Examples 4-1 to 4-2

Secondary batteries were prepared under the same conditions as in Example 1-2, except for changing the type of phosphate as shown in Table 4. The first time efficiency and slurry stability were then evaluated.

TABLE 4

SiOx (x = 0.9); $D_{50}$ = 6 μm; graphite (natural graphite:artificial graphite = 5:5), $D_{50}$ = 20 μm; SiOx ratio: 10 mass %; Li compound: [$Li_2SiO_3$, $Li_2Si_2O_5$]; carbon material average thickness: 40 nm; specific surface area: 3.1 m²/g; half value width of Si(220) face in XRD: 1.7°, Si crystallite: 5 nm; modification method: thermal doping; NMR peaks: A > B; $m_p$ = 2.2 × 10⁻⁵, $m_l$ = 1.1 × 10⁻⁴, $m_p/m_l$ = 0.2; dispersion pH: 12.0

| | Phosphate | First time efficiency | 20° C. Pot life (hr) | 40° C. Pot life (hr) |
|---|---|---|---|---|
| Example 4-1 | $Na_3PO_4$ | 86.8% | 48 | 24 |
| Example 4-2 | $Al(H_2PO_4)_3$ | 87.5% | 72 | 48 |
| Example 1-2 | $AlPO_4$ | 88.1% | 168< | 144 |

As shown in Table 4, the aluminum-containing phosphate resulted in higher slurry stability. Moreover, aluminum phosphate tribasic ($AlPO_4$) having higher aluminum content had more favorable slurry stability than aluminum phosphate monobasic ($Al(H_2PO_4)_3$).

Examples 5-1 to 5-2

Secondary batteries were prepared under the same conditions as in Example 1-2 except for changing the crystal structure of aluminum phosphate tribasic as shown in Table 5. The first time efficiency and slurry stability were then evaluated.

TABLE 5

SiOx (x = 0.9); $D_{50}$ = 6 μm; graphite (natural graphite:artificial graphite = 5:5), $D_{50}$ = 20 μm; SiOx ratio: 10 mass %; Li compound: [$Li_2SiO_3$, $Li_2Si_2O_5$]; carbon material average thickness: 40 nm; specific surface area: 3.1 m²/g; half value width of Si(220) face in XRD: 1.7°, Si crystallite: 5 nm; modification method: thermal doping; NMR peaks: A > B; phosphate: $AlPO_4$; $m_p$ = 2.2 × 10⁻⁵, $m_l$ = 1.1 × 10⁻⁴, $m_p/m_l$ = 0.2; dispersion pH. 12.0

| | $AlPO_4$ crystal structure | First time efficiency | 20° C. Pot life (hr) | 40° C. Pot life (hr) |
|---|---|---|---|---|
| Example 5-1 | berlinite | 87.1% | 120 | 72 |
| Example 5-2 | tridymite | 87.4% | 120 | 72 |
| Example 1-2 | cristobalite | 88.1% | 168< | 144 |

As can be seen from Table 5, the aluminum phosphate tribasic having a cristobalite-type crystal structure achieved more favorable slurry stability than berlinite and tridymite types.

Examples 6-1 to 6-4

Secondary batteries were prepared under the same conditions as in Example 1-2, except that the pH value was changed when the negative electrode active material particles were dispersed in a proportion of 10 mass % into pure water. The first time efficiency and slurry stability were then evaluated. The pH of each 10 mass % dispersion was changed by: changing the temperature or the amount of LiH blended when the negative electrode active material particles were modified; and by washing the modified negative electrode active material particles with pure water.

TABLE 6

SiOx (x = 0.9); $D_{50}$ = 6 μm; graphite (natural graphite:artificial graphite = 5:5), $D_{50}$ = 20 μm; SiOx ratio: 10 mass %; Li compound: [$Li_2SiO_3$, $Li_2Si_2O_5$]; carbon material average thickness: 40 nm; specific surface area: 3.1 m²/g; half value width of Si(220) face in XRD: 1.7°, Si crystallite: 5 nm; modification method: thermal doping; NMR peaks: A > B; phosphate: $AlPO_4$, $m_p$ = 2.2 × 10⁻⁵, $m_l$ = 1.1 × 10⁻⁴, $m_p/m_l$ = 0.2; cristobalite type

| | pH of 10 mass % dispersion | First time efficiency | 20° C. Pot life (hr) | 40° C. Pot life (hr) |
|---|---|---|---|---|
| Example 6-1 | 9.7 | 87.4% | 72 | 24 |
| Example 6-2 | 10.1 | 87.6% | 144 | 72 |
| Example 1-2 | 12.0 | 88.1% | 168< | 144 |
| Example 6-3 | 12.5 | 88.4% | 168< | 72 |
| Example 6-4 | 12.8 | 88.2% | 72 | 24 |

As shown in Table 6, when the pH of the 10 mass % dispersion was within the range of 10 or more and 12.5 or less, particularly favorable slurry stability was achieved.

Examples 7-1 to 7-2

Secondary batteries were prepared under the same conditions as in Example 1-2, except that the crystallinity of the silicon compound particles was changed as shown in Table 7. The first time efficiency and slurry stability were then evaluated. Note that the crystallinity in the silicon compound particles can be controlled by changing the evaporation temperature of the raw material or by heat treatment after formation of the silicon compound particles.

TABLE 7

SiOx (x = 0.9); $D_{50}$ = 6 μm; graphite (natural graphite:artificial graphite = 5:5), $D_{50}$ = 20 μm; SiOx ratio: 10 mass %; Li compound: [$Li_2SiO_3$, $Li_2Si_2O_5$]; carbon material average thickness: 40 nm; specific surface area: 3.1 m²/g; modification method: thermal doping; NMR peaks: A > B; phosphate: $AlPO_4$; $m_p$ = 2.2 × 10⁻⁵, $m_l$ = 1.1 × 10⁻⁴, $m_p/m_l$ = 0.2; cristobalite type; dispersion pH: 12.0

| | Crystallite size (nm) | First time efficiency | 20° C. Pot life (hr) | 40° C. Pot life (hr) |
|---|---|---|---|---|
| Example 1-2 | 5 | 88.1% | 168< | 144 |
| Example 7-1 | 7.5 | 88.5% | 168 | 120 |
| Example 7-2 | 8 | 88.6% | 144 | 72 |

As shown in Table 7, when the crystallite size was 7.5 nm or less, the pot life of the slurry stored at 40° C. was particularly improved.

Example 8-1

A secondary battery was prepared under the same conditions as in Example 1-2, except that the silicon compound satisfied a relation of A<B, where A is the maximum peak intensity value in the Si and Li silicate regions, and B is the peak intensity value derived from the $SiO_2$ region. The first time efficiency and slurry stability were then evaluated. In this case, the amount of lithium inserted during the modification was decreased to decrease the amount of $Li_2SiO_3$, and decrease the peak intensity A derived from $Li_2SiO_3$.

TABLE 8

SiOx (x = 0.9); $D_{50}$ = 6 μm; graphite (natural graphite:artificial graphite = 5:5), $D_{50}$ = 20 μm; SiOx ratio: 10 mass %;
Li compound: [$Li_2SiO_3$, $Li_2Si_2O_5$]; carbon material average thickness: 40 nm; specific surface area: 3.1 m²/g; half value width of Si(220) face in XRD: 1.7°, Si crystallite: 5 nm; modification method: thermal doping; phosphate: $AlPO_4$, $m_p$ = 2.2 × $10^{-5}$, $m_1$ = 1.1 × $10^{-4}$, $m_p/m_1$ = 0.2, cristobalite type; dispersion pH: 12.0

| | A, B | First time efficiency | 20° C. Pot life (hr) | 40° C. Pot life (hr) |
|---|---|---|---|---|
| Example 1-2 | A > B | 88.1% | 168< | 144 |
| Example 8-1 | B > A | 87.3% | 120 | 48 |

As can be seen from Table 8, the slurry stability was more favorable when the peak intensity relation was A>B.

Examples 9-1 to 9-6

Secondary batteries were prepared under the same conditions as in Example 1-2, except that the median diameter and BET specific surface area of the silicon compound particles were changed as shown in Table 9. The first time efficiency and slurry stability were then evaluated.

TABLE 9

SiOx (x = 0.9); graphite (natural graphite:artificial graphite = 5:5), $D_{50}$ = 20 μm; SiOx ratio: 10 mass %;
Li compound: [$Li_2SiO_3$, $Li_2Si_2O_5$]; carbon material average thickness: 40 nm;
half value width of Si(220) face in XRD: 1.7°, Si crystallite: 5 nm; modification method: thermal doping; phosphate: $AlPO_4$, $m_p$ = 2.2 × $10^{-5}$, $m_1$ = 1.1 × $10^{-4}$, $m_p/m_1$ = 0.2, cristobalite type; dispersion pH. 12.0

| | Median diameter (μm) | BET specific surface area (m2/g) | First time efficiency | 20° C. Pot life (hr) | 40° C. Pot life (hr) |
|---|---|---|---|---|---|
| Example 9-1 | 0.5 | 20 | 86.8% | 96 | 48 |
| Example 9-2 | 1 | 10 | 88.0% | 144 | 72 |
| Example 1-2 | 6 | 3.1 | 88.1% | 168< | 144 |
| Example 9-3 | 6 | 4.9 | 88.3% | 168< | 120 |
| Example 9-4 | 6 | 6.3 | 88.1% | 168< | 72 |
| Example 9-5 | 15 | 1.0 | 87.7% | 168< | 168 |
| Example 9-6 | 20 | 0.9 | 86.5% | 168< | 168 |

When the negative electrode active material particles had a median diameter of 1.0 μm or more and 15 μm or less, the initial efficiency was further improved. Moreover, when the specific surface area was within the range of 1.0 or more and 5.0 or less, the stability of the slurry stored at 40° C. was further improved.

Example 10-1

A secondary battery was prepared under the same conditions as in Example 1-2, except that the surfaces of the silicon-based active material particles were not coated with a carbon material. The first time efficiency and slurry stability were then evaluated.

Examples 10-2 to 10-5

Secondary batteries were prepared under the same conditions as in Example 1-2, except that the average thickness of the carbon materials covering the surfaces of the silicon-based active material particles was each changed as shown in Table 11. The first time efficiency and slurry stability were then evaluated. The average thickness of the carbon materials was adjusted by changing CVD conditions.

TABLE 10

SiOx (x = 0.9); $D_{50}$ = 6 μm; graphite (natural graphite:artificial graphite = 5:5), $D_{50}$ = 20 μm; SiOx ratio: 10 mass %;
Li compound: [$Li_2SiO_3$, $Li_2Si_2O_5$]; specific surface area: 3.1 m²/g;
half value width of Si(220) face in XRD: 1.7°, Si crystallite: 5 nm; modification method: thermal doping; NMR peaks: A > B;
phosphate: $AlPO_4$; $m_p$ = 2.2 × $10^{-5}$, $m_1$ = 1.1 × $10^{-4}$, $m_p/m_1$ = 0.2; cristobalite type; dispersion pH: 12.0

| | Average thickness (nm) of carbon material | First time efficiency | 20° C. Pot life (hr) | 40° C. Pot life (hr) |
|---|---|---|---|---|
| Example 10-1 | 0 | 86.5% | 96 | 48 |
| Example 10-2 | 5 | 87.0% | 120 | 72 |
| Example 10-3 | 10 | 88.0% | 168< | 120 |
| Example 1-2 | 40 | 88.1% | 168< | 144 |
| Example 10-4 | 1000 | 87.9% | 168< | 168 |
| Example 10-5 | 1200 | 86.8% | 168< | 168< |

As can be seen from Table 10, coating with the carbon material increased the initial efficiency. In addition, particularly when the carbon material layer had a thickness of 10 nm or more, slurry stability improvements were observed. Meanwhile, when the carbon layer had a thickness of 1000 nm or less, the amount of silicon compound particles was sufficiently secured in battery design, and did not decrease the battery capacity thereby.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:
1. A negative electrode active material for a non-aqueous electrolyte secondary battery, containing negative electrode active material particles, wherein
the negative electrode active material particles comprise silicon compound particles each containing a silicon compound represented by $SiO_x$ where $0.5 \leq x \leq 1.6$, the silicon compound particle also contains at least one or more of $Li_2SiO_3$ and $Li_2Si_2O_5$, the negative electrode active material comprises a phosphate, the negative electrode active material particles each have a surface containing lithium element, a ratio $m_p/m_l$ satisfies $0.07 \leq m_p/m_l \leq 0.8$, where $m_l$ represents a molar quantity of the lithium element present on the surfaces of the negative electrode active material particles per unit mass of the negative electrode active material particles, and $m_p$ represents a molar quantity of phosphorus element contained per unit mass of the negative electrode active material particles, and the negative electrode active material particles cause a dispersion containing 10 mass % of the negative electrode active material particles dispersed in pure water to have a pH value of 10 or more and 12.5 or less.

2. The negative electrode active material according to claim 1, wherein the phosphate is aluminum phosphate tribasic.

3. The negative electrode active material according to claim 2, wherein the aluminum phosphate tribasic has a cristobalite crystal structure.

4. The negative electrode active material according to claim 1, wherein the silicon compound particles have a diffraction peak attributable to a Si(220) crystal face obtained from an X-ray diffraction using a Cu-Kα line, and a crystallite size calculated from a half value width (2θ) of the diffraction peak is 7.5 nm or less.

5. The negative electrode active material according to claim 1, wherein the silicon compound particles satisfy a relation of A>B, where A represents a maximum peak intensity value in Si and Li silicate regions given as a chemical shift value of −60 to −95 ppm, and B represents a peak intensity value in a $SiO_2$ region given as a chemical shift value of −96 to −150 ppm, the values being obtained from a $^{29}$Si-MAS-NMR spectrum of the silicon compound particles.

6. The negative electrode active material according to claim 1, wherein the negative electrode active material particles have a median diameter of 1.0 μm or more and 15 μm or less and a BET specific surface area of 1 m²/g or more and 5 m²/g or less.

7. The negative electrode active material according to claim 1, wherein the negative electrode active material particle has a surface layer portion containing a carbon material.

8. The negative electrode active material according to claim 7, wherein the carbon material has an average thickness of 10 nm or more and 1000 nm or less.

9. A mixed negative electrode active material comprising:
the negative electrode active material according to claim 1; and
a carbon-based active material.

10. An aqueous negative electrode slurry composition for a non-aqueous electrolyte secondary battery, comprising the negative electrode active material according to claim 1.

11. A method for producing a negative electrode active material containing negative electrode active material particles including silicon compound particles, the method comprising steps of:

preparing silicon compound particles each containing a silicon compound represented by $SiO_x$ where $0.5 \leq x \leq 1.6$;

inserting Li into the silicon compound particles to incorporate at least one or more of $Li_2SiO_3$ and $Li_2Si_2O_5$; and blending the negative electrode active material particles with a phosphate to produce a negative electrode active material satisfying a ratio $m_p/m_l$ of $0.07 \leq m_p/m_l \leq 0.8$, where $m_l$ represents a molar quantity of lithium element present on surfaces of the negative electrode active material particles per unit mass of the negative electrode active material particles, and $m_p$ represents a molar quantity of phosphorus element contained per unit mass of the negative electrode active material particles, and wherein the negative electrode active material particles cause a dispersion containing 10 mass % of the negative electrode active material particles dispersed in pure water to have a pH value of 10 or more and 12.5 or less.

* * * * *